(12) United States Patent
Engelgau et al.

(10) Patent No.: US 10,605,561 B2
(45) Date of Patent: Mar. 31, 2020

(54) EJECTION LAUNCHER

(71) Applicant: Fruity Chutes Inc, Monte Sereno, CA (US)

(72) Inventors: Eugene Engelgau, Monte Sereno, CA (US); Christopher John Attebery, Gilroy, CA (US)

(73) Assignee: Fruity Chutes Inc, Monte Sereno, CA (US)

(*) Notice: Subject to any disclaimer, the term of this patent is extended or adjusted under 35 U.S.C. 154(b) by 0 days.

(21) Appl. No.: 16/242,908

(22) Filed: Jan. 8, 2019

(65) Prior Publication Data

US 2019/0212094 A1 Jul. 11, 2019

Related U.S. Application Data

(60) Provisional application No. 62/614,615, filed on Jan. 8, 2018.

(51) Int. Cl.
| | | |
|---|---|---|
| *B64D 17/00* | (2006.01) | |
| *F41B 7/00* | (2006.01) | |
| *B64D 17/70* | (2006.01) | |
| *F42C 15/40* | (2006.01) | |
| *F42C 15/21* | (2006.01) | |

(52) U.S. Cl.
CPC ............... *F41B 7/00* (2013.01); *B64D 17/70* (2013.01); *F42C 15/21* (2013.01); *F42C 15/40* (2013.01)

(58) Field of Classification Search
CPC ............ B64D 17/70; B64D 17/80; F41B 7/00
See application file for complete search history.

(56) References Cited

U.S. PATENT DOCUMENTS

| 1,067,559 A | * | 7/1913 | Steinmetz | B64D 17/80 244/139 |
|---|---|---|---|---|
| 2,718,369 A | * | 9/1955 | MacMillan | B64D 17/70 244/149 |
| 4,050,657 A | * | 9/1977 | Murphy | B64D 17/80 244/139 |
| 2016/0318615 A1 | * | 11/2016 | Pick | B64C 39/024 |

FOREIGN PATENT DOCUMENTS

| FR | 3046988 | * | 7/2017 | ............ B64D 17/70 |
|---|---|---|---|---|
| FR | 30146988 | * | 7/2017 | ............ B64D 17/70 |

* cited by examiner

*Primary Examiner* — John E Simms, Jr.

(57) ABSTRACT

An ejection launcher is an apparatus that effectively ejects a payload while maintaining a compact structure. The apparatus includes an elongated enclosure, a cover, a trigger mechanism, a spring-loaded piston, and a payload. The elongated enclosure positions and connects the trigger mechanism with the spring-loaded piston. The elongated enclosure also houses the spring-loaded piston and the payload. The trigger mechanism releases the spring-loaded piston which forces the payload from within the elongated enclosure. The payload is a desired delivered item and is preferably a parachute. The trigger mechanism and the spring-loaded piston translates horizontal force into vertical force which releases the payload and reduces the release resistance. The trigger mechanism preferably utilizes and includes a servo motor with a output arm. The output arm pushes against a catch plate of the trigger mechanism and releases a catch pin of the spring-loaded piston.

7 Claims, 8 Drawing Sheets

EJECTION LAUNCHER

The current application claims priority to U.S. provisional application Ser. No. 62/614,615 filed on Jan. 8, 2018.

FIELD OF THE INVENTION

The present invention relates generally to launchers. More specifically, the present invention is an ejection launcher that utilizes the force of a mechanical spring.

BACKGROUND OF THE INVENTION

People have been preoccupied with the idea of flight for centuries. The concept of slowing down the fall of gravity using air resistance has been disclosed in primitive forms as early as 4000 years ago. The basic idea of a parachute as we know it, was illustrated in an anonymous artifact dating back to 1470's during the Italian Renaissance, which portrays a man sustaining a controlled descent while being supported by a structure above his head. A more realistic model was further developed by Leonardo da Vinci which shows a man being sustained by a parachute with more realistically scaled proportions.

The modern parachute as we know it was invention in 1783 by Sebastien Lenormand, who also sustained the first public jump in the same year. Parachutes are continuously evolving, and advancements in technology and modern materials allowed for more efficient design and integration into various applications. Parachutes are used in modern times in a variety of applications, ranging from safety devices, to generating an airbrake and reduce the speed of a falling object. Depending on the task and the scale of usage, each parachute has various features and characteristics, however the general basic components and method of operation remain largely the same.

Most parachutes have a pull-string, which when activated releases the pilot chute. The pilot chute is a secondary parachute used to release the main parachute. The pull-string is attached to a spring-loaded canister which contains the compressed pilot chute. The force needed to expand a spring is directly proportional to the distance of travel and depending on the scale of the parachute it may require a substantial amount of force to pull. In applications where the parachute must be activated without human input, an automated system must be integrated. Furthermore, the spring canister requires a substantial amount of space which can be difficult to integrate in more compact storage items, such as backpacks. Drones have become increasingly popular in recent years, and widely available to the general public. The aerial equipment used in military and consumer applications is costly and as such it is not uncommon to have integrated safety devices to protect the hardware in case of a malfunction. Integrating a parachute into conventional drones, can be an expensive and complex task, however the present invention aims to solve some of these problems by disclosing a low profile compact and light weight ballistic parachute launcher with an integrated servo motor.

DETAILED DESCRIPTION OF THE INVENTION

All illustrations of the drawings are for the purpose of describing selected versions of the present invention and are not intended to limit the scope of the present invention.

Figure 1:
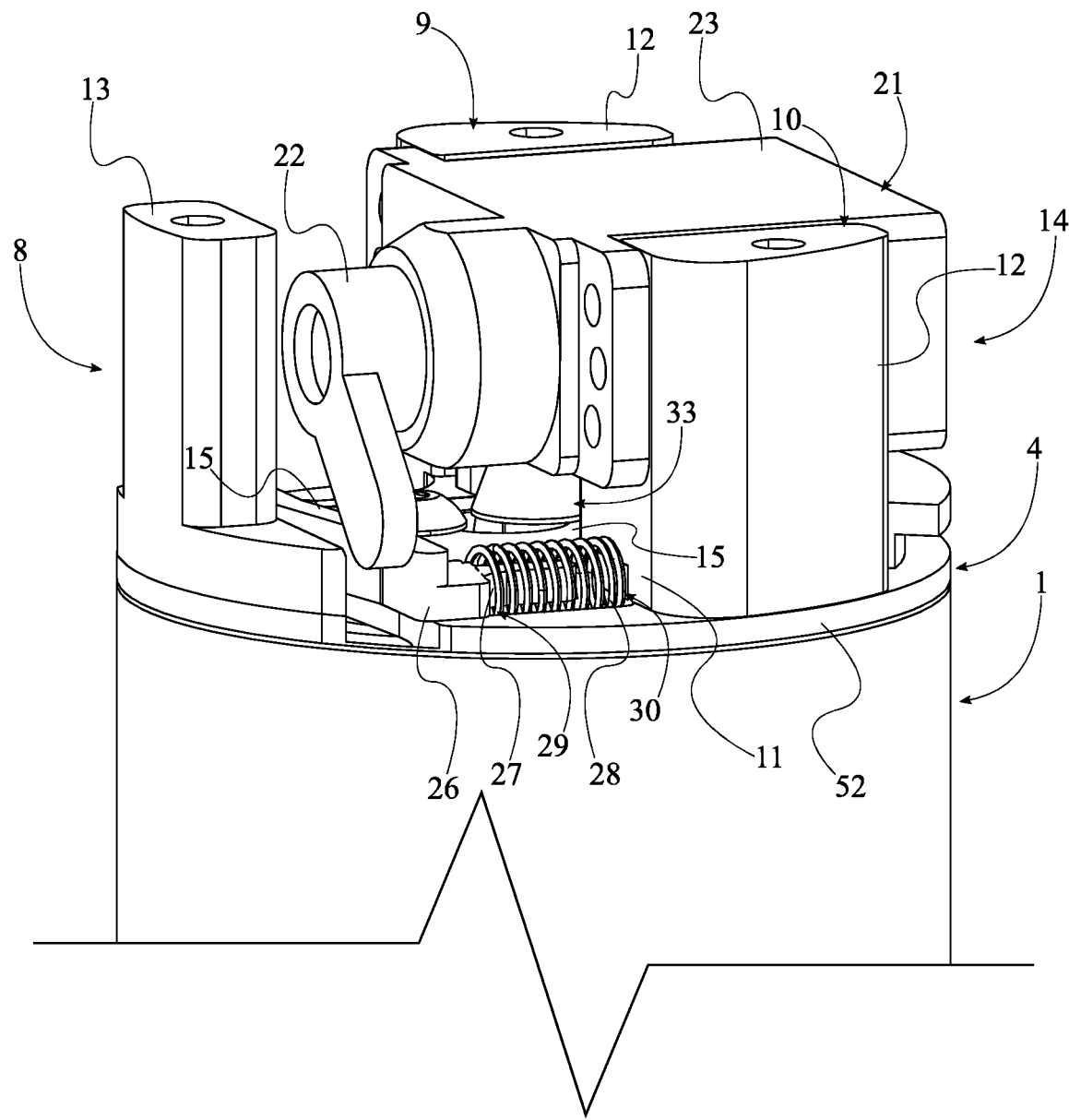
FIG. 1 is bottom perspective view of a preferred embodiment of the present invention.

The present invention is an ejection launcher that overcomes release resistance with an actuator. The present invention comprises a low-profile construction, simplistic method of operation, and a simple reloading procedure. More specifically, the present invention comprises a compact arrangement. In order for the present invention to produce effective deployment the present invention comprises an elongated enclosure 1, a cover 4, a trigger mechanism 14, a spring-loaded piston 31, and a payload 42, seen in FIG. 1. The elongated enclosure 1 and the cover 4 contain the trigger mechanism 14, the spring-loaded piston 31, and the payload 42. The elongated enclosure 1 is preferably a canister with a circular cross-sectional shape, seen in FIG. 2, FIG. 6, and FIG. 7. The elongated enclosure 1 may comprise a variety of shapes and sizes in order to accommodate the payload 42. In an alternate embodiment of the present invention, the elongated enclosure 1 specifically comprises a rectangular cross-sectional shape, seen in FIG. 3 and FIG. 5. The cover 4 mounts the trigger mechanism 14 with the elongated enclosure 1. Consequently, the cover 4 preferably comprises a cross-sectional shape that mirrors that of the elongated enclosure 1. The trigger mechanism 14 releases and locks the spring-loaded piston 31. The spring-loaded piston 31 forces the payload 42 out of the elongated enclosure 1. The payload 42 is a desired item that meant to be delivered from a distance. The payload 42 is preferably a parachute. However, alternate embodiments of the present invention may comprise a payload 42 that is a life vest, durable containers of food and medical supplies, a variety of aerial packages, and so on.

Figure 2:
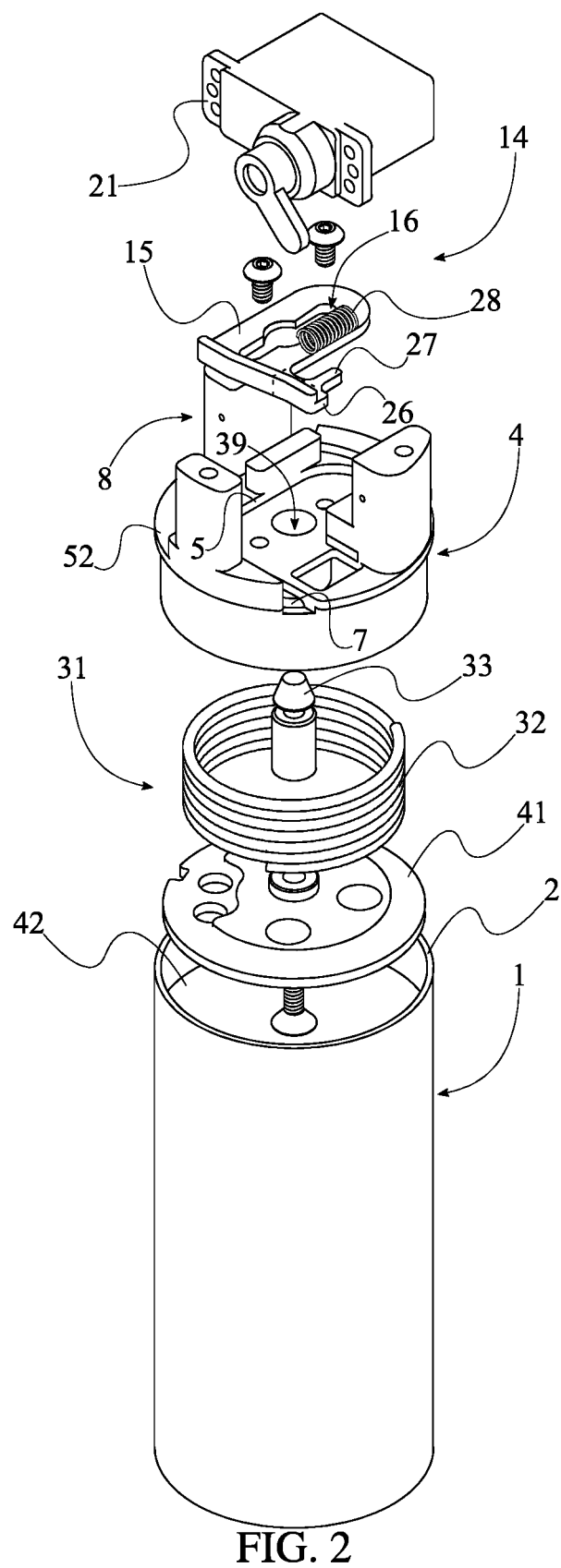
FIG. 2 is bottom exploded view of the preferred embodiment of the present invention.
Figure 3:
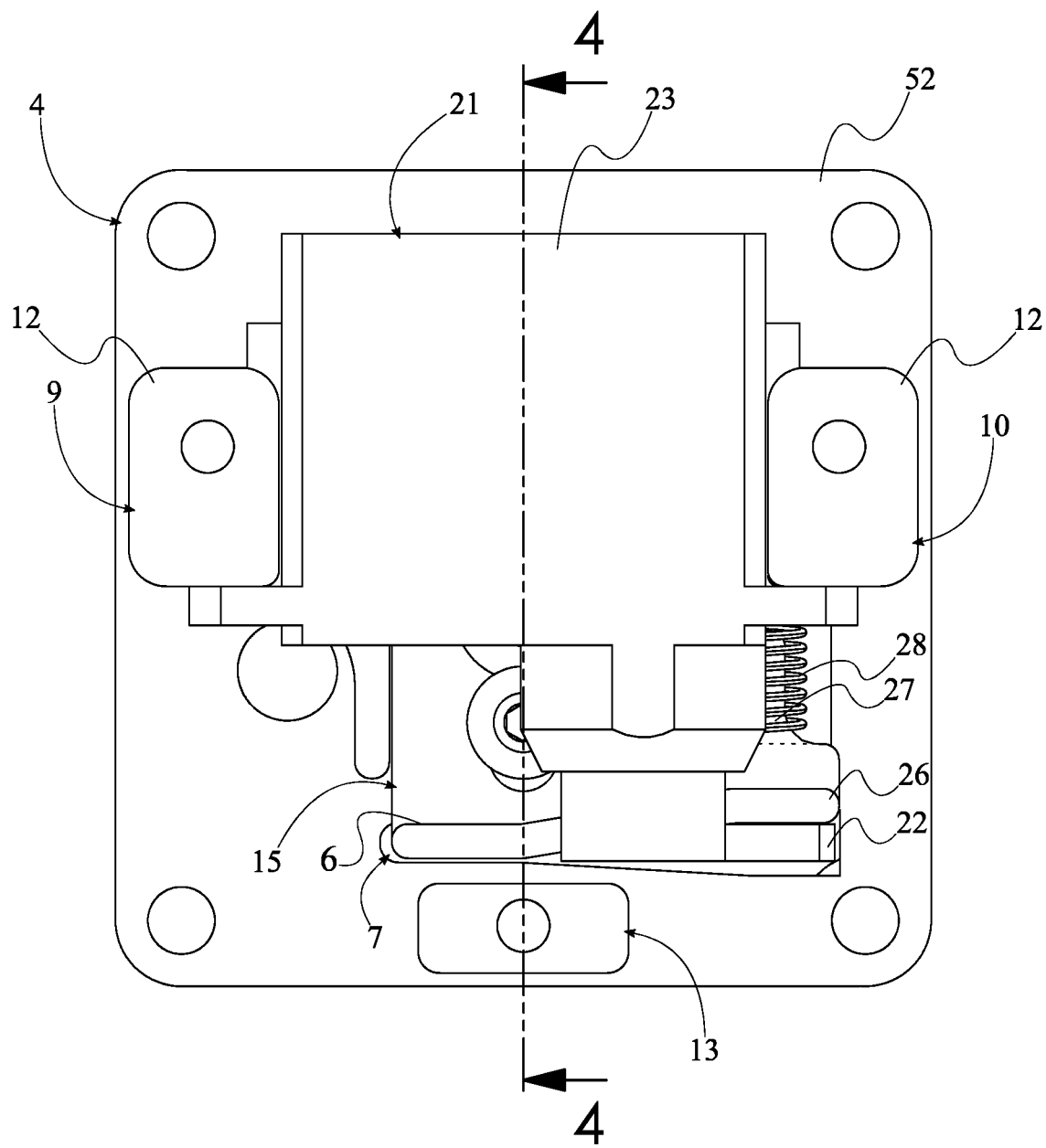
FIG. 3 is bottom side view of an alternate embodiment of the present invention with a catch plate with a rectangular cross-sectional shape.

More specifically, the trigger mechanism 14 comprises a catch plate 15, a pin slot 16, and an actuator 21, and the spring-loaded piston 31 comprises a main spring 32, a catch pin 33, and a main slot 39, seen in FIG. 2. The catch plate 15 locks and releases the catch pin 33. The pin slot 16 allows the catch pin 33 to engage with the catch plate 15. The actuator 21 maneuvers the catch plate 15. The main spring 32 provides the necessary force to deploy the payload 42 from within the elongated enclosure 1. Moreover, in a retracted configuration, the main spring 32 is compressed within the elongated enclosure 1, thereby storing enough mechanical potential energy to eject the payload 42 with considerable velocity. The main slot 39 allows the trigger mechanism 14 to be engaged with the spring-loaded piston 31 through the cover 4.

Figure 4:
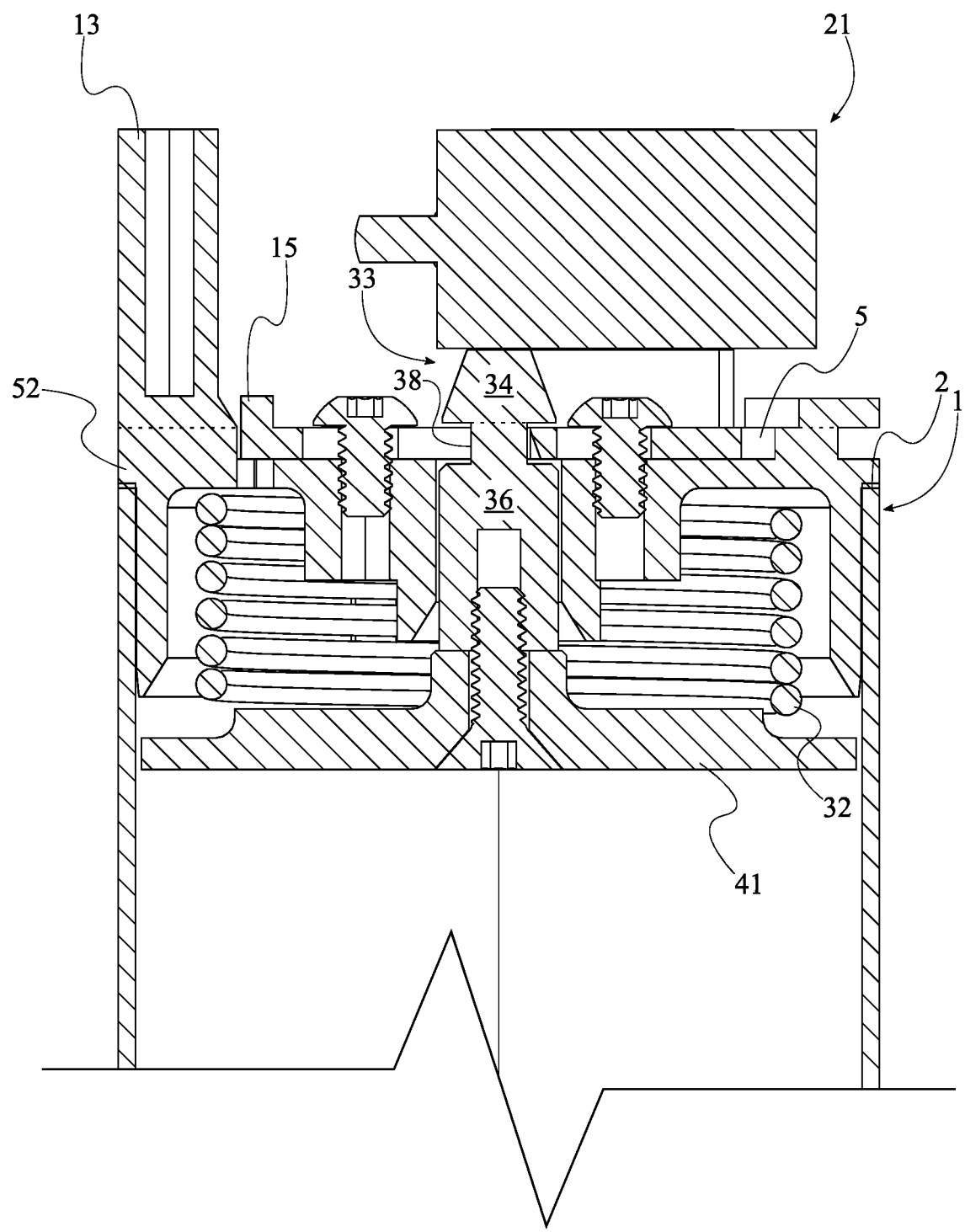
FIG. 4 is cross-sectional view of FIG. 3 along line 4-4 of the present invention.

The overall configuration of the aforementioned components allows rotational movement to be translated into lateral movement, releasing the spring-loaded piston 31. As seen in FIG. 2 and FIG. 4, the cover 4 is connected adjacent a first rim 2 of the elongated enclosure 1. The catch plate 15 is positioned adjacent the cover 4, opposite the elongated enclosure 1, and is slidably mounted onto the cover 4. The path of release of the payload 42 from within the elongated enclosure 1 is therefore continuous and uninhibited. The actuator 21 locks and releases the catch plate 15 as the actuator 21 is positioned adjacent the catch plate 15, opposite the cover 4, and is mounted onto the cover 4. The pin slot 16 traverses through the catch plate 15, and the main slot 39 traverses through the cover 4, allowing the catch pin 33 to engage with the catch plate 15. Moreover, the catch pin 33 is centrally fixed to a piston cap 41 of the spring-loaded piston 31, evenly distributing the force of the main spring 32. The piston cap 41 pushes against the payload 42 with the force of the main spring 32. Moreover, the payload 42, the piston cap 41, and the main spring 32 are positioned within the elongated enclosure 1. The spring-loaded piston 31 is engaged with the trigger mechanism 14 as the piston cap 41 is connected to the cover 4 with the main spring 32, and the catch pin 33 is removably attached with the catch plate 15 through the main slot 39. In order for the spring-loaded piston 31 to be controlled by the trigger mechanism 14, the trigger mechanism 14 is operatively coupled with the spring-loaded piston 31, wherein an output arm 22 of the actuator 21 pushes the catch plate 15 and releases the catch pin 33 from the pin slot 16. The connection of trigger mechanism 14 and the spring-loaded piston 31 with the elongated enclosure 1 are preserved while the payload 42 exits the elongated enclosure 1 as the payload 42 is positioned adjacent the piston cap 41, opposite the main spring 32.

In order for the present invention to be reusable, the trigger mechanism 14 further comprise a connecting arm 26, a tab 27, and a return spring 28, and the cover 4 comprises a main plate 52, a catch plate track 5, and a bed 8, seen in FIG. 1, FIG. 2, FIG. 3, FIG. 5, and FIG. 7. The connecting arm 26 offsets the tab 27 from the catch plate 15. The return spring 28 pushes the catch plate 15 against the catch pin 33 with the tab 27. The main plate 52 connects the cover 4 to the elongated enclosure 1. Moreover, the main plate 52 is removably attached with the elongated enclosure 1 with a lateral wall of the cover 4 that is mounted within the first rim 2 of the elongated enclosure 1. The catch plate track 5 positions and contains the catch plate 15. The bed 8 upholds the actuator 21 and positions the output arm 22. The range of motion of the catch plate 15 within the catch plate track 5 is maximized as the connecting arm 26 is terminally fixed with the catch plate 15 and is oriented perpendicular with the catch plate 15. Furthermore, the tab 27 is fixed adjacent the connecting arm 26, positioned opposite the catch plate 15, and is oriented perpendicular with the connecting arm 26. The catch plate 15 automatically slides within the catch plate track 5 with the return spring 28 as the return spring 28 is positioned around and along the tab 27, and the catch plate track 5 is integrated into and traverses across the main plate 52. More specifically, a first end 29 of the return spring 28 is positioned adjacent with the connecting arm 26, and a second end 30 of the return spring 28 is positioned adjacent with the bed 8. In order to position the actuator 21 and orient the output arm 22 with the catch plate 15, the bed 8 is fixed with the main plate 52, opposite the elongated enclosure 1, and the actuator 21 is offset from the main plate 52 with the bed 8. Consequently, the elongated enclosure 1 is refillable as the catch plate 15, the connecting arm 26, and the tab 27 are slidably engaged with the catch plate track 5. The output arm 22 pushes the catch plate 15 as the connecting arm 26 is positioned between the output arm 22 and the tab 27.

Figure 7:
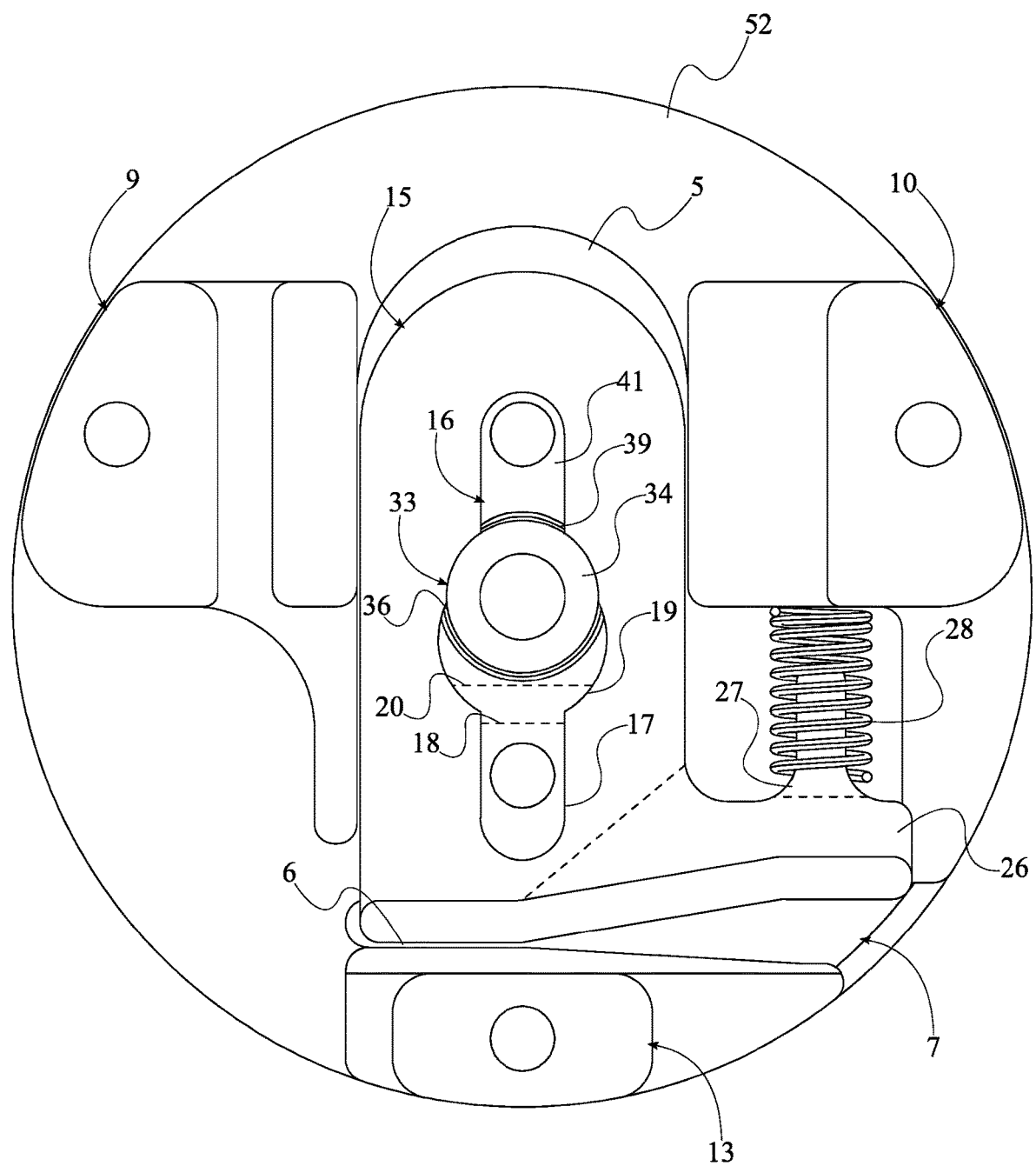
FIG. 7 is schematic view of a catch pin, a main slot, and a piston cap of a spring-loaded piston with a catch plate, a pin slot, a connecting arm, a tab, and a return spring of a trigger mechanism of the present invention.

In the preferred embodiment of the present invention, shown in FIG. 7, the bed 8 comprises a first holder arm 9, a second holder arm 10, and a bumper arm 13. The first holder arm 9 and the second holder arm 10 uphold and laterally surround the actuator 21 as the first holder arm 9 and the second holder arm 10 each comprises a base 11 and a post 12. The bumper arm 13 prevents the housing 23 from slipping past the grip of the first holder arm 9 and the second holder arm 10 as a result of the force of the output arm 22 against the connecting arm 26. The base 11 and the bumper arm 13 are fixed to the main plate 52. The post 12 is fixed to the base 11, positioned opposite the main plate 52. The actuator 21 is positioned in between the post 12 of the first holder arm 9, the post 12 of the second holder arm 10, and the bumper arm 13, preventing the actuator 21 from sliding as the output arm 22 pushes against the connecting arm 26. More specifically, the base 11 is positioned in between the main plate 52 and the actuator 21 allowing the catch plate 15 to freely move within the catch plate track 5. Furthermore, the bumper arm 13 is oriented at an acute angle with both the first holder arm 9 and the second holder arm 10 in order to effectively surround the actuator 21.

The actuator 21 effectively controls the spring-loaded piston 31 while preserving the compact construction of the present invention as the actuator 21 is preferably a servo motor, seen in FIG. 1, FIG. 2, FIG. 3, and FIG. 4, and the cover 4 comprises an output arm slot 7. The output arm slot 7 provides a continuous and smooth path for the output arm 22. The output arm slot 7 traverses into the main plate 52, adjacent the catch plate track 5, accommodating the path of the output arm 22. Moreover, the output arm slot 7 traverses along a first lateral edge 6 of the catch plate 15. A rotor 24 of the servo motor is positioned within a housing 23 of the servo motor. The housing 23 contains the rotor 24. The rotor 24 rotates the shaft 25. A shaft 25 of the servo motor traverses through the housing 23. The shaft 25 connects the output arm 22 with the rotor 24. More specifically, the shaft 25 is oriented perpendicular with the output arm slot 7 and is rotatably coupled with the rotor 24. The output arm 22 is terminally fixed to the shaft 25, opposite the rotor 24. Moreover, the output arm 22 is oriented perpendicular with the shaft 25 and is aligned with the output arm slot 7. The output arm 22 is slidably engaged within the output arm slot 7. The connecting arm 26 is preferably angled with the catch plate 15 such that the rotation of the output arm 22 freely slides enters and exits the output arm slot 7 while pushing against the connecting arm 26. The housing 23 is mounted with the bed 8 in order to secure the actuator 21 with the bed 8. In the preferred embodiment of the present invention, the housing 23 is fixed to the first holder arm 9 and the second holder arm 10 with a couple of screws. It is understood that various embodiments of the present invention may comprise a housing 23 that is secured to the bed with a variety of fasteners.

Figure 5:
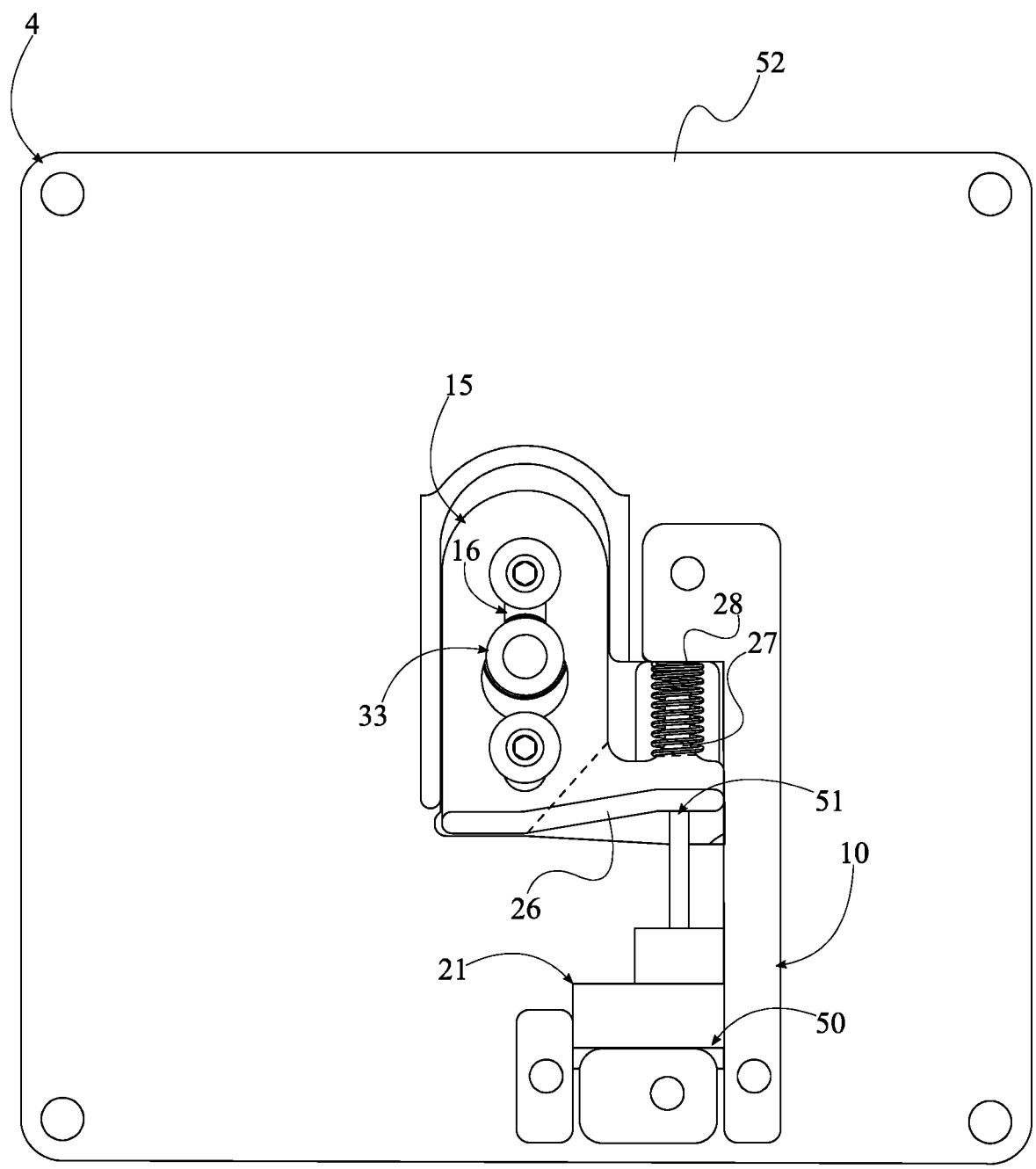
FIG. 5 is bottom side view of an alternate embodiment with a linear actuator as an actuator of the present invention.

In an alternate embodiment of the present invention, the actuator 21 is a linear actuator, seen in FIG. 5. This alternate embodiment may be utilized if the cover 4 comprises large cross-section dimensions that correspond with a large elongated enclosure 1. A fixed end 29 of the linear actuator is mounted with the bed 8. A pushing end 51 of the liner actuator is positioned adjacent and oriented towards the connecting arm 26. This arrangement allows the linear motion of the output arm 22 to push against the catch plate 15 and release the catch pin 33.

In order for the catch pin 33 to be released and locked with the pin slot 16, the pin slot 16 comprises an elongated portion 17 and a notch 19, seen in FIG. 7, and the catch pin 33 comprises a head 34 and a main shaft 36, seen in FIG. 4. The elongated portion 17 locks the catch pin 33, prevents the head 34 from passing through the pin slot 16. The notch 19 releases the catch pin 33, allowing the head 34 to pass through the pin slot 16. The elongated portion 17 allows the catch plate 15 to slide, and consequently the catch pin 33, as the elongated portion 17 traverses across the catch plate 15. The catch pin 33 is released as the notch 19 is positioned along the elongated portion 17 and is preferably centered along the elongated portion 17. The spring-loaded piston 31 is engaged with the pin slot 16 as the piston cap 41 is terminally fixed to the main shaft 36, and the head 34 is fixed to the main shaft 36, opposite the piston cap 41. A locking groove 38 of the catch pin 33 laterally traverses into and around the main shaft 36. The locking groove 38 structurally reinforces the connection between the catch pin 33 within the pin slot 16. Moreover, the locking groove 38 is positioned adjacent the head 34. The locking groove 38 is slidably engaged along the elongated portion 17 in order for the catch plate 15 to push the catch pin 33 and release the catch pin 33. The head 34 is slidably engaged with the notch 19, thereby releasing the catch pin 33, and consequently ejecting the payload 42. More specifically, a first width 18 of the elongated portion 17 is smaller than a second width 20 of the notch 19.

Figure 8:
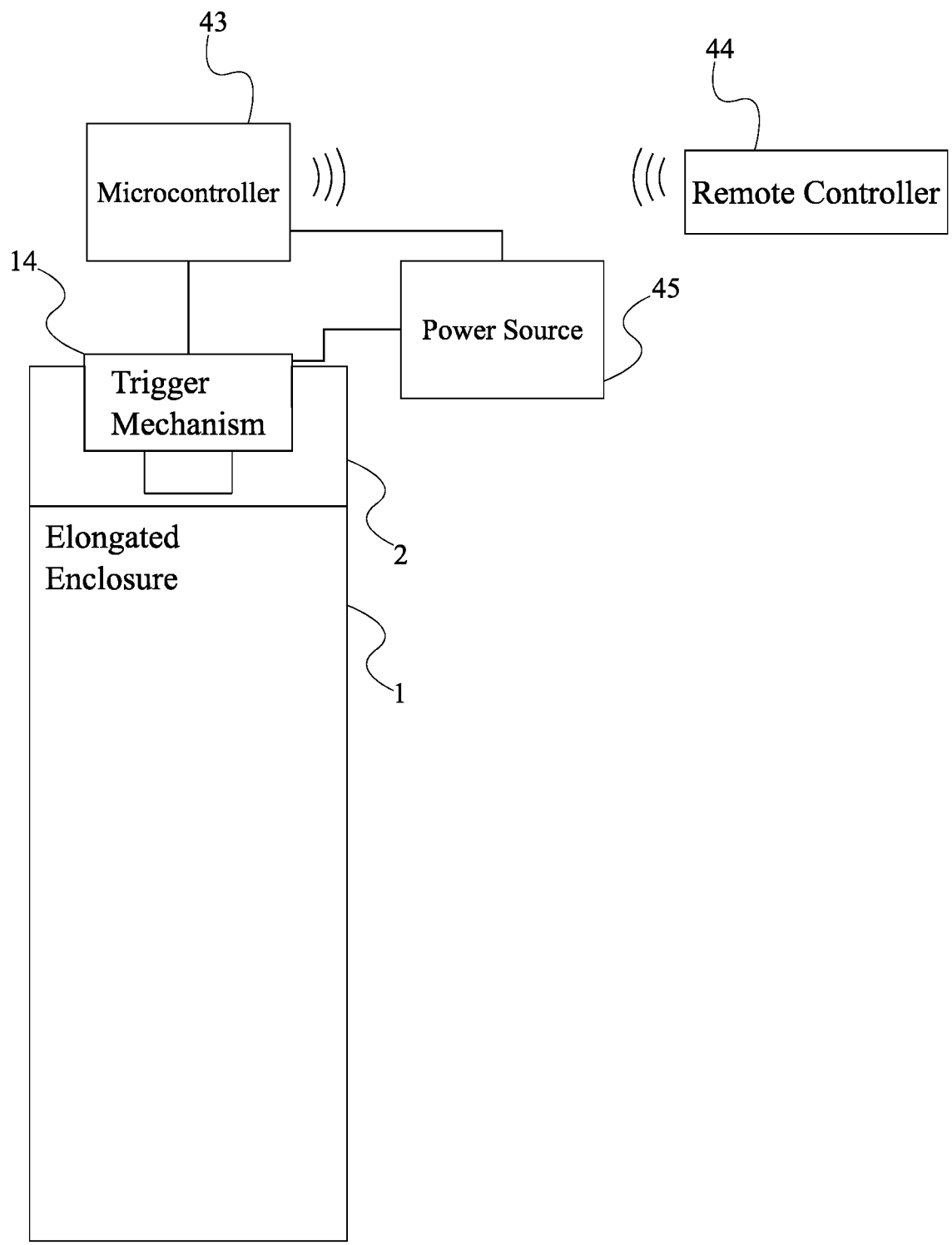
FIG. 8 is schematic view of the electronic components of the present invention.

In order for a user to control the actuator 21, the present invention further comprises a microcontroller 43, a remote controller 44, and a power source 45, shown in FIG. 8. The microcontroller 43 controls the extension and retraction of the output arm 22. The remote controller 44 allows a user to operate the microcontroller 43 from a distance. The power source 45 provides the necessary power for the actuator 21 to operate and is preferably a portable battery. The microcontroller 43 is electronically connected to the trigger mechanism 14 The power source 45 is electrically connected to the microcontroller 43 and the trigger mechanism 14. Moreover, the remote controller 44 is wirelessly coupled with the microcontroller 43. The remote controller 44 is manually operated by a user or receives commands of an automated program. The remote controller 44 is may also be coupled with a variety of sensors.

Figure 6:
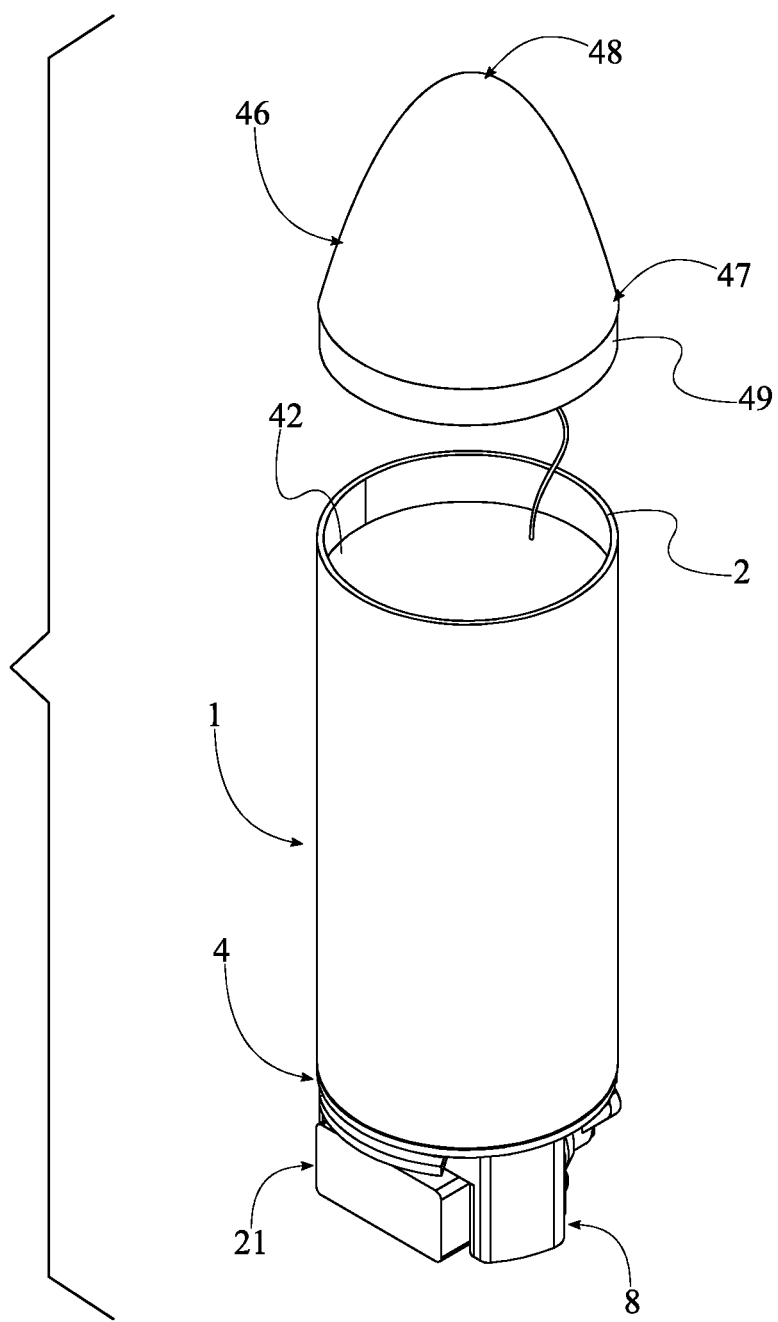
FIG. 6 is top exploded view of the present invention with a nozzle detached from a second rim of an elongated enclosure.

The present invention preferably further comprises a nozzle 46, shown in FIG. 6. The nozzle 46 reduces the resistance against the payload 42 once the payload 42 has been ejected from the elongated enclosure 1. Moreover, the nozzle 46 encloses the payload 42 within the elongated enclosure 1. The nozzle 46 tapers from a first end 47 of the nozzle 46 to a second end 48, thereby defining an aerodynamic structure. A rim 49 of the nozzle 46 is perimetrically fixed to the first end 47 of the nozzle 46. The rim 49 is removably attached to a second rim 3 of the elongated enclosure 1. Moreover, the second rim 3 of the elongated enclosure 1 is positioned opposite the first rim 2 of the elongated enclosure 1, across the elongated enclosure 1. The payload 42 travels with less resistance as the payload 42 is connected to the second end 48 of the nozzle 46.

Although the invention has been explained in relation to its preferred embodiment, it is to be understood that many other possible modifications and variations can be made without departing from the spirit and scope of the invention as hereinafter claimed.

What is claimed is:

1. An ejection launcher comprising:
an elongated enclosure;
a cover;
a trigger mechanism;
a spring-loaded piston;
a payload;
the elongated enclosure comprising a first rim;
the trigger mechanism comprising a catch plate, a pin slot and an actuator;
the spring-loaded piston comprising a main spring, a catch pin, a main slot and a piston cap;
the cover being connected to the first rim;
the catch plate being adjacently positioned to the cover;
the catch plate being oppositely positioned to the elongated enclosure;
the catch plate being slidably mounted onto the cover;
the actuator being adjacently positioned to the catch plate;
the actuator being oppositely positioned to the cover;
the actuator being mounted onto the cover;
the pin slot traversing through the catch plate;
the main slot traversing through the cover;
the catch pin being centrally fixed to the piston cap;
the payload, the piston cap and the main spring being positioned within the elongated enclosure;
the piston cap being connected to the cover via the main spring;
the main spring being biased in between the piston cap and the cover;
the catch pin removably attached with the catch plate through the main slot;
the trigger mechanism being operatively coupled with the spring-loaded piston;
the actuator comprising an output arm;
the output arm being configured to push the catch plate and to release the catch pin from the pin slot;
the payload being adjacently positioned to the piston cap;
the payload being oppositely positioned to the main spring;
the trigger mechanism comprising a connecting arm, a tab and a return spring;
the cover comprising a main plate, a catch plate track and a bed;
the connecting arm being terminally fixed with the catch plate;
the connecting arm being perpendicularly oriented with the catch plate;
the tab being fixed to the connecting arm;
the tab being oppositely positioned to the catch plate;
the tab being perpendicularly oriented with the connecting arm;
the return spring being positioned around and along the tab;
the catch plate track being integrated into and traversing across the main plate;
the bed being fixed with the main plate;
the bed being oppositely positioned to the elongated enclosure;
the actuator being offset from the main plate with the bed;
the catch plate, the connecting arm and the tab being slidably engaged with the catch plate track;
the connecting arm being positioned in between the output arm and the tab;
the pin slot comprising an elongated portion and a notch;
the catch pin comprising a locking groove, a head and a main shaft;
the elongated portion traversing across the catch plate;

the notch being positioned along the elongated portion;
the piston cap being terminally fixed to the main shaft;
the head being fixed to the main shaft;
the head being oppositely positioned to the piston cap;
the locking groove laterally traversing into and around the main shaft;
the locking groove being adjacently positioned to the head;
the locking groove being slidably engaged along the elongated portion;
the head being slidably engaged through the notch; and
a width of the elongated portion being smaller than a width of the notch.

2. The ejection launcher as claimed in claim 1 comprising:
the bed comprising a first holder arm, a second holder arm and a bumper arm;
the first holder arm and the second holder arm each comprising a base and a post;
the base and the bumper arm each being fixed to the main plate;
the post being fixed to the base;
the post being oppositely positioned to the main plate;
the actuator being positioned in between the post of the first holder arm, the post of the second holder arm and the bumper arm;
the base being positioned in between the main plate and the actuator; and
the bumper arm being oriented at an acute angle with both of the first holder arm and the second holder arm.

3. The ejection launcher as claimed in claim 1 comprising:
the actuator being a servo motor;
the cover comprising an output arm slot;
the output arm slot traversing into the main plate;
the output arm slot being adjacently positioned to the catch plate track;
the output arm slot traversing along a first lateral edge of the catch plate;
the servo motor comprising a rotor, a housing and a shaft;
the rotor being positioned within the housing;
the shaft traversing through the housing;
the shaft being perpendicularly oriented with the output arm slot;
the shaft being rotatably coupled with the rotor;
the output arm being terminally fixed to the shaft;
the output arm being oppositely positioned to the rotor;
the output arm being perpendicularly oriented with the shaft;
the output arm being aligned with the output arm slot;
the output arm being slidably engaged within the output arm slot; and
the housing being mounted with the bed.

4. The ejection launcher as claimed in claim 1 comprising:
the actuator being a linear actuator;
the linear actuator comprising a fixed end and a pushing end;
the fixed end being mounted with the bed; and
the pushing end being adjacently positioned to and oriented towards the connecting arm.

5. The ejection launcher as claimed in claim 1 comprising:
the return spring comprising a first end and a second end;
the first end being adjacently positioned with the connecting arm; and
the second end being adjacently positioned with the bed.

6. The ejection launcher as claimed in claim 1 comprising:
a microcontroller;
a remote controller;
a power source;
the microcontroller being electronically connected to the trigger mechanism;
the power source being electrically connected to the microcontroller and the trigger mechanism; and
the remote controller being wirelessly coupled with the microcontroller.

7. The ejection launcher as claimed in claim 1 comprising:
a nozzle;
the nozzle tapering from a first end of the nozzle to a second end;
a rim of the nozzle being perimetrically fixed to the first end;
the rim being removably attached to a second rim of the elongated enclosure;
the second rim of the elongated enclosure being oppositely positioned to the first rim of the elongated enclosure across the elongated enclosure; and
the payload being connected to the second end of the nozzle.

* * * * *